US 12,430,945 B2

(12) United States Patent
Rosqvist

(10) Patent No.: US 12,430,945 B2
(45) Date of Patent: Sep. 30, 2025

(54) METHOD AND DEVICE FOR AUTHENTICATING AN IDENTITY OF A PERSON

(71) Applicant: Precise Biometrics AB, Lund (SE)

(72) Inventor: Fredrik Rosqvist, Malmö (SE)

(73) Assignee: Precise Biometrics AB, Lund (SE)

( * ) Notice: Subject to any disclaimer, the term of this patent is extended or adjusted under 35 U.S.C. 154(b) by 0 days.

(21) Appl. No.: 18/574,444

(22) PCT Filed: Jun. 27, 2022

(86) PCT No.: PCT/EP2022/067589
§ 371 (c)(1),
(2) Date: Dec. 27, 2023

(87) PCT Pub. No.: WO2023/274969
PCT Pub. Date: Jan. 5, 2023

(65) Prior Publication Data
US 2024/0371196 A1 Nov. 7, 2024

(30) Foreign Application Priority Data
Jun. 29, 2021 (EP) .................................... 21182304

(51) Int. Cl.
G06V 40/12 (2022.01)
G06V 10/75 (2022.01)

(52) U.S. Cl.
CPC ........ *G06V 40/1365* (2022.01); *G06V 10/759* (2022.01); *G06V 40/1347* (2022.01)

(58) Field of Classification Search
CPC ............. G06V 40/1365; G06V 10/759; G06V 40/1347
See application file for complete search history.

(56) References Cited

U.S. PATENT DOCUMENTS

| 9,942,222 | B1* | 4/2018 | Fenton ................ H04L 63/0853 |
| 2002/0125437 | A1* | 9/2002 | Izumi ..................... H01L 27/12 257/E27.111 |
| 2017/0076132 | A1* | 3/2017 | Sezan ..................... G06V 40/50 |
| 2021/0224503 | A1* | 7/2021 | Cheng ..................... G06F 3/042 |
| 2021/0319782 | A1* | 10/2021 | Gong ..................... G10L 15/08 |

FOREIGN PATENT DOCUMENTS

CN 111753722 A * 10/2020 ............. G06V 10/25

OTHER PUBLICATIONS

Omid Zanganeh et al., "Partial Fingerprint Alignment and Matching Through Region-Based Approach", Advances in Mobile Computing and Multimedia, ACM, Dec. 11, 2015, p. 275-284.

* cited by examiner

*Primary Examiner* — Yuzhen Shen
(74) *Attorney, Agent, or Firm* — Capitol City TechLaw

(57) ABSTRACT

A method for authenticating an identity of a person may involve acquiring a sample fingerprint image of a finger of the person. Two or more sub-portions may be extracted from the sample fingerprint image to form a plurality of fingerprint test images. A fingerprint recognition may be independently run on the plurality of fingerprint test images. The identity of the person may be authenticated upon a positive outcome from the independently run finger-print recognitions. A device may be provided for authenticating an identity of a person.

14 Claims, 3 Drawing Sheets

ID OF A PERSON

METHOD AND DEVICE FOR AUTHENTICATING AN IDENTITY OF A PERSON

This application claims priority under 35 USC 119(a)-(d) from EP patent application No. 21182304.2 filed on Jun. 29, 2021, the entire contents of which are incorporated herein by reference.

TECHNICAL FIELD

The present invention relates to fingerprint authentication.

BACKGROUND

Authenticating an identity of a person can be made using different authentication methods and can be used in different situations. Examples of authentication methods are passwords, pin-codes, face recognition and fingerprint recognition. Examples of situations where authenticating an identity of a person is used are logging into an electronic device and logging in to an application run on an electronic device. Other examples are accessing a building or a part of a building.

Different authentication methods have different requirements on the level of security. Hence, depending on the level of security needed different authentication methods may be chosen. A common authentication method of today is fingerprint recognition. Using fingerprint recognition is generally considered a moderate level of security. However, for some applications the level of security needs to be increased. Then, multiple methods for authenticating an identity may be used. Alternatively, another method having a higher level of security may be used. Hence, there is a need in increasing the level of security for fingerprint recognition.

SUMMARY OF THE INVENTION

It is an object to mitigate, alleviate or eliminate one or more of the above-identified deficiencies in the art and disadvantages singly or in any combination and solve at least the above-mentioned problem.

According to a first aspect a computer implement method for authenticating an identity of a person is provided. The method comprising: acquiring a sample fingerprint image of a finger of the person; extracting two or more sub-portions from the sample fingerprint image forming a plurality of fingerprint test images; independently running a fingerprint recognition on the plurality of fingerprint test images; and authenticating the identity of the person upon a positive outcome from the independently run finger-print recognitions.

The method is based on the insight made by the inventor that by extracting two or more separate fingerprint test images from a larger sample fingerprint image the overall level of security in the fingerprint recognition may be enhanced significantly. This since the level of security in each independently run fingerprint recognition may be multiplied with each other. For example, having two fingerprint recognitions with a level of security of 1:10 000 each will by the present invention induce an overall level of security of 1:100 000 000. The inventive approach is further beneficial since the enhancement in level of security may be gained with maintained, or just slightly increased, processing speed and processing demands. This since already developed fingerprint recognition algorithm(s) may be used in performing the independently run fingerprint recognitions. Further, the fingerprint recognition algorithm used does not need to take into account more fingerprint information. Typically, by an increase in a size of a fingerprint test image will induce a quadratic increase in processing demands for the fingerprint recognition algorithm. The now presented approach will just induce a linear increase in processing demands.

Each sub-portion of the sample fingerprint image may be a cohesive cutout from the sample fingerprint image. By a cohesive cutout is meant a cutout that is a single unified portion of the sample image.

Each of the two or more sub-portions may be set to comprise unique fingerprint information from the sample fingerprint image. Hence, the plurality of fingerprint test images may be made to be uncorrelated. The two or more sub-portions may be set to comprise unique fingerprint information making the two or more sub-portions to be non-overlapping sub-portions of the sample fingerprint image. Alternatively, overlapping fingerprint information being present in two or more of the plurality of fingerprint test images may be masked-out or erased. By arranging so that fingerprint information in the plurality of fingerprint test images is uncorrelated it may be safeguarded that each fingerprint recognition is unrelated to the other one. This allows for an overall increased level of security in the authentication of the identity of the person.

The two or more sub-portions may have a same size. That is the plurality of fingerprint test images may have a same size. This allows for a same format on the input to all the independently run fingerprint recognitions.

A same type of fingerprint recognition algorithm may be run in all the fingerprint recognitions. This allow for a simple and processing effective method since the same fingerprint recognition algorithm may be used for all the independently run fingerprint recognitions.

The sample fingerprint image may be of a size larger than or equal to 10×10 mm, preferably larger than or equal to 14×14 mm. By this is may be safeguarded that enough fingerprint information is acquired to be used to form the plurality of fingerprint test images.

A resolution of the sample fingerprint image may be larger than or equal to 250 dpi. By this it may be safeguarded that the quality of the fingerprint information is good enough to run the fingerprint recognition algorithm(s).

Independently running a fingerprint recognition on the plurality of fingerprint test images may comprise independently matching the respective fingerprint test image against a pre-recorded fingerprint (or key features of a pre-recorded fingerprint) of the finger of the person.

According to a second aspect a non-transitory computer-readable storage medium is provided. The non-transitory computer-readable storage medium having stored thereon instructions for implementing the method according to the first aspect, when executed on a device having processing capabilities.

The above-mentioned features and effects of the method of the first aspect, when applicable, apply to this second aspect as well. In order to avoid undue repetition, reference is made to the above.

According to a third aspect a device for authenticating an identity of a person is provided. The device comprising circuitry configured to execute: a fingerprint test image extraction function configured to extract two or more sub-portions from a sample fingerprint image of a finger of the person, thereby forming a plurality of fingerprint test images; a fingerprint recognition function configured to independently run a fingerprint recognition on the plurality of fingerprint test images; and an authentication function configured to authenticate the identity of the person upon a positive outcome from the independently run finger-print recognitions.

The device may further comprise a fingerprint sensor configured to acquire the sample fingerprint image.

The fingerprint sensor may be of a size larger than or equal to 10×10 mm, preferably larger than or equal to 14×14 mm. By this is may be safeguarded that enough fingerprint information is acquired to be used to form the plurality of fingerprint test images.

The device may be implemented in a wearable electronic device, such as a smart device.

The above-mentioned features and effects of the method of the first aspect, when applicable, apply to this third aspect as well. In order to avoid undue repetition, reference is made to the above.

A further scope of applicability will become apparent from the detailed description given below. However, it should be understood that the detailed description and specific examples are given by way of illustration only.

It is to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

A device and method for authenticating an identity of a person based on fingerprint recognition will be discussed in connection with FIGS. 1-3.

Figure 1:
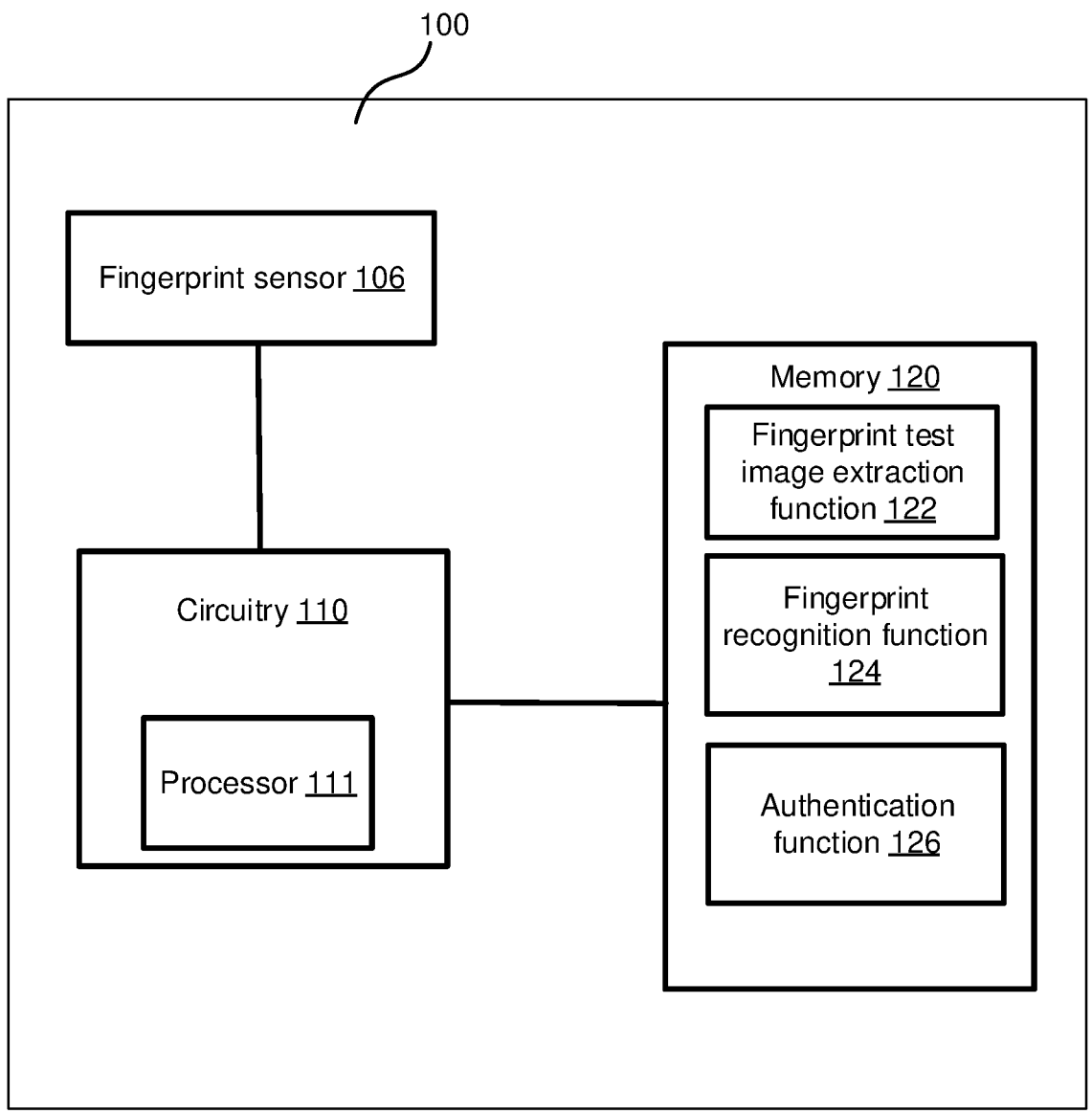
FIG. 1 schematically illustrate a device for authenticating an identity of a person.

The device 100 for authenticating an identity of a person is schematically illustrated in FIG. 1. The device 100 may e.g. be an electronic device. The electronic device may be a computer, stationary or a laptop. The electronic device may be a smart device, such as smart phone, a smart watch, a tablet or the like. The device may form part of an access control 25 system. The device 100 comprises circuitry 110. The circuitry 110 is configured to carry out overall control of functions and operations of the device 100. The circuitry 110 may include a processor 111, such as a central processing unit (CPU), microcontroller, or microprocessor. The processor 111 is configured to execute program code stored in a memory 120, in order to carry out functions and operations of the device 100.

The memory 120 may be one or more of a buffer, a flash memory, a hard drive, a removable medium, a volatile memory, a non-volatile memory, a random access memory (RAM), or another suitable device. In a typical arrangement, the memory 120 may include a non-volatile memory for long term data storage and a volatile memory that functions as system memory for the circuitry 110. The memory 120 may exchange data with the circuitry 110 over a data bus. Accompanying control lines and an address bus between the memory 120 and the circuitry 110 also may be present.

Functions and operations of the device 100 may be embodied in the form of executable logic routines (e.g., lines of code, software programs, etc.) that are stored on a non-transitory computer readable medium (e.g., the memory 120) of the device 100 and are executed by the circuitry 110 (e.g., using the processor 111). Furthermore, the functions and operations of the device 100 may be a stand-alone software application or form a part of a software application that carries out additional tasks related to the device 100. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The circuitry 110 is configured to execute a fingerprint test image extraction function 122. The fingerprint test image extraction function 122 is configured to extract two or more sub-portions from a sample fingerprint image. The extracted two or more sub-portions from a sample fingerprint image forms a plurality of fingerprint test images. The extraction of two or more sub portions from a sample fingerprint image will now be discussed in more detail in connection with FIG. 2.

The fingerprint test image extraction function 122 is using a sample fingerprint image 200 as input. The sample fingerprint image 200 may be captured using a fingerprint sensor 106. The fingerprint sensor 106 may, as illustrated in FIG. 1, form part of the device 100. The fingerprint sensor 106 may e.g. be arranged under a touch sensitive screen of the device 100. Alternatively, fingerprint sensor 106 may be arranged at a location of the device 100 dedicated for the fingerprint sensor 106. However, it is readily understood that the device 100 may receive the sample fingerprint image from another device comprising a fingerprint sensor. The fingerprint sensor used for capturing the sample fingerprint image 200 is preferably of a size larger than or equal to 10×10 mm, more preferably a size larger than or equal to 14×14 mm. According one specific embodiment, the fingerprint sensor is of the size 15×17 mm. The fingerprint sensor used for capturing the sample fingerprint image 200 does preferably capture fingerprint images of a resolution of 250 dpi or more. Hence, the sample fingerprint image 200 will have a resolution of 250 dpi or more and a size of 10×10 mm or more, preferably 14×14 mm or more. According to one specific embodiment the sample fingerprint image 200 is of a size of 15×17 mm.

The fingerprint test image extraction function 122 is, as discussed above, configured to extract two or more sub-portions 202A, 202B from the sample fingerprint image 200. The two or more sub-portions 202A, 202B are forming fingerprint test images 204A, 204B. Hence, the fingerprint test image extraction function 122 is extracting a plurality of fingerprint test images 204A, 204B from the sample fingerprint image 200. Preferably, each sub-portion 202 of the sample fingerprint image 200 is a cohesive cutout from the sample fingerprint image 200. Further, each sub-portion 202A, 202B of the sample fingerprint image 200 is preferably of a same size. Hence, all of the plurality of fingerprint test images 204A, 204B are preferably of a same size. For example, the fingerprint test images 204A, 204B may be of a size of 4×4 mm, 6×6 mm, or 8×8 mm. It is readily understood that other sizes of the fingerprint test images 204A, 204B may be used.

Moreover, fingerprint test image extraction function 122 may be configured to extract the two or more sub-portions 202A, 202B so that they each comprise unique fingerprint information from the sample fingerprint image. Hence, the plurality of fingerprint test images may be made to be uncorrelated. In other words, the plurality of fingerprint test images 204A, 204B does not contain any common information. The two or more sub-portions may be set to comprise unique fingerprint information by making the two or more sub-portions to be non-overlapping sub-portions of the sample fingerprint image 200. Alternatively, upon the two or more sub-portions 202A, 202B indeed are cutout so that they comprise some degree of overlap, the fingerprint test image extraction function 122 may be configured to at least partly mask out information in overlapping region in the respective plurality of fingerprint test images 204A, 204B. For example, in case two fingerprint test images 204A, 204B are formed and they comprise an overlapping region a portion of (e.g. half) the information in the overlap for one of the fingerprint test images 204A, 204B and a complementary portion of (e.g. the other half) the information in the overlap for the other of the fingerprint test images 204A, 204B may be masked out. Yet alternatively, the information in the overlap may be eased from both (or all) of the fingerprint test images 204A, 204B.

Figure 2:
FIG. 2 is a schematic illustration of extraction of two or more sub-portions from a sample fingerprint image.
Figure 3:
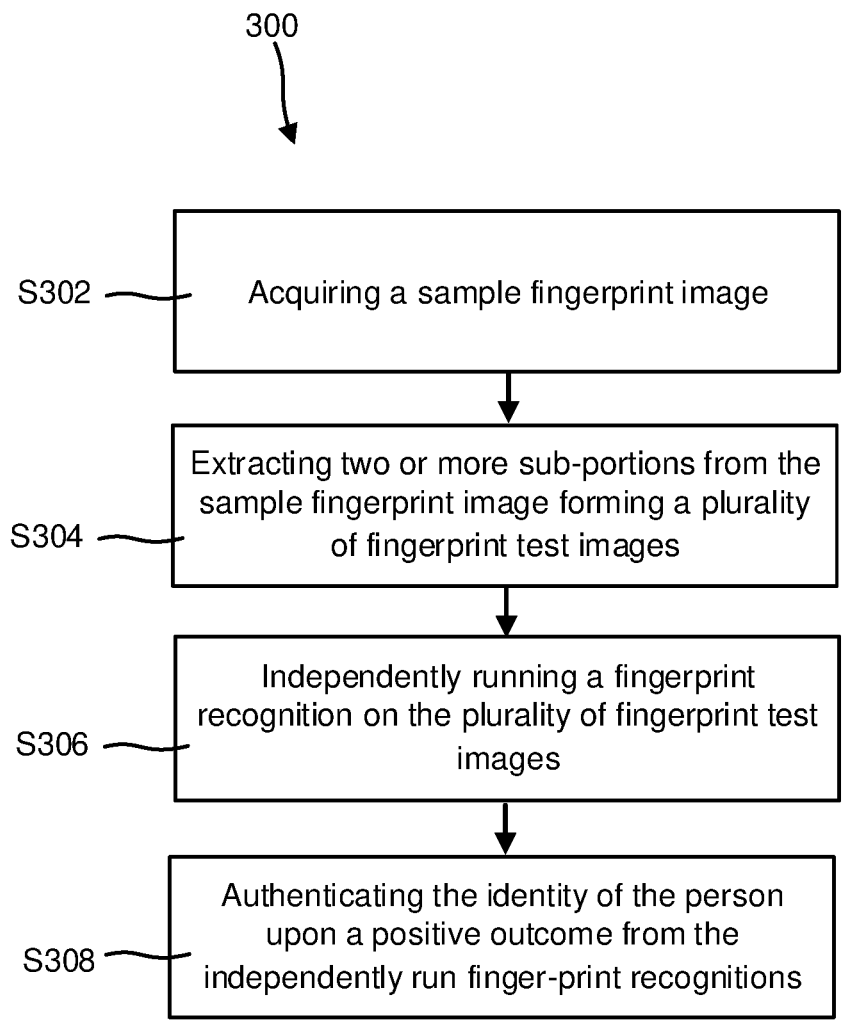
FIG. 3 is a block scheme of a method for authenticating an identity of a person.

As illustrated in FIG. 2 two fingerprint test images 204A, 204B may be formed. The two fingerprint test images 204 may be formed from an upper left portion (or cutout) and a lower right portion (or cutout) of the sample fingerprint image 200. Alternatively, the two fingerprint test images 204 may be formed from an upper right portion (or cutout) and a lower left portion (or cutout) of the sample fingerprint image 200. Yet alternatively, four fingerprint test images 204A, 204B may be formed from the upper left, upper right, lower left and lower right portions (or cutouts) of the sample fingerprint image 200. It is readily understood that these are just examples of how to subdivide the sample fingerprint image 200 into sub-portions 202A, 202B.

The circuitry 110 is further configured to execute a fingerprint recognition function 124. The fingerprint recognition function 124 is configured to independently run a fingerprint recognition on the plurality of fingerprint test images 204A, 204B. Independently running a fingerprint recognition on the plurality of fingerprint test images 204A, 204B comprises independently matching the respective fingerprint test image 204A, 204B against a pre-recorded fingerprint (or key features thereof) of a finger of the person. The fingerprint recognition may be performed by any to the skilled person known fingerprint recognition algorithm. Such a fingerprint recognition algorithm may be based on a minutiae matcher. However, as readily understood by the skilled person other types of fingerprint recognition algorithms may be used as well. Preferably, the fingerprint recognition function 124 is configured to run a same type of fingerprint recognition on each of the plurality of fingerprint test images 204A, 204B. For example, the same fingerprint recognition algorithm is used for performing the fingerprint recognition on all of the fingerprint test images 204A, 204B.

The circuitry 110 is further configured to execute an authentication function 126. The authentication function 126 is configured to authenticate the identity of the person. In more detail, the authentication function 126 is configured to authenticate the identity of the person upon a positive outcome from the independently run finger-print recognitions. Preferably, from all of the independently run fingerprint recognitions.

In connection with FIG. 3 a method 300 for authenticating an identity of a person will be discussed. Some of all the steps of the method 300 may be performed by the functions of the device 100 described above. However, it is equally realized that some or all of the steps of the method 300 may be performed by similar functions performed at other devices. The method 300 comprises the following steps. The steps may be performed in any suitable order.

Acquiring S302 a sample fingerprint image 200 of a finger of the person. The sample fingerprint image 200 may be acquired by the same device as the device performing the method. Alternatively, the sample fingerprint image 200 may be acquired by another device comprising a fingerprint sensor.

Extracting S304 two or more sub-portions 202A, 202B from the sample fingerprint image 200 forming a plurality of fingerprint test images 204A, 204B. The extraction of the two or more sub-portions 202A, 202B from the sample fingerprint image 200 forming the plurality of fingerprint test images 204A, 204B is discussed in detail above in connection with the fingerprint test image extraction function 122, in order to avoid undue repetition reference is made to the above discussion of the fingerprint test image extraction function 122.

Independently running S306 a fingerprint recognition on the plurality of fingerprint test images 204A, 204B. The independent running of a fingerprint recognition on the plurality of fingerprint test images 204A, 204B is discussed in detail above in connection with the fingerprint recognition function 124, in order to avoid undue repetition reference is made to the above discussion of the fingerprint recognition function 124.

Authenticating S308 the identity of the person upon a positive outcome from the independently run finger-print recognitions. The authentication of the identity of the person upon a positive outcome from the independently run finger-print recognitions is discussed in detail above in connection with the authentication function 126, in order to avoid undue repetition reference is made to the above discussion of the authentication function 126.

The person skilled in the art realizes that the present invention by no means is limited to what is explicitly described above. On the contrary, many modifications and variations are possible within the scope of the appended claims.

For example, the device 100 may e.g. be an electronic device. The electronic device may be a computer, stationary or a laptop. The electronic device may be a smart device, such as smart phone, a smart watch, a tablet or the like. The device may form part of an access control system.

Additionally, variations can be understood and effected by the skilled person in practicing the claimed invention, from a study of the drawings, the disclosure, and the appended claims.

The invention claimed is:

1. A computer implemented method for authenticating an identity of a person, the method comprising:
   acquiring a sample fingerprint image of a finger of the person;
   extracting four sub-portions from the sample fingerprint image forming four fingerprint test images from an upper left portion, an upper right portion, a lower left portion, and a lower right portion of the sample fingerprint image;
   independently running a fingerprint recognition on all of the fingerprint test images;
   authenticating the identity of the person upon a positive outcome from all of the independently run fingerprint recognitions; and
   masking out information in an overlapping region in the fingerprint test images, such that the fingerprint test images are uncorrelated.

2. The method according to claim 1, wherein each sub-portion of the sample fingerprint image is a cohesive cutout from the sample fingerprint image.

3. The method according to claim 1, wherein the four sub-portions have a same size.

4. The method according to claim 1, wherein a same type of fingerprint recognition algorithm is run in all the fingerprint recognitions.

5. The method according to claim 1, wherein the sample fingerprint image is of a size larger than or equal to 10×10 mm.

6. The method according to claim 1, wherein the sample fingerprint image is of a size larger than or equal to 14×14 mm.

7. The method according to claim 1, wherein a resolution of the sample fingerprint image is larger than or equal to 250 dpi.

8. The method according to claim 1, wherein independently running a fingerprint recognition on the plurality of fingerprint test images comprises independently matching the respective fingerprint test image against a pre-recorded fingerprint of the finger of the person.

9. A non-transitory computer-readable storage medium having stored thereon instructions for implementing the method according to claim 1, when executed on a device having processing capabilities.

10. A device for authenticating an identity of a person, the device comprising circuitry configured to execute:
    a fingerprint test image extraction function configured to extract four sub-portions from a sample fingerprint image of a finger of the person, thereby forming four fingerprint test images from an upper left portion, an upper right portion, a lower left portion, and a lower right portion of the sample fingerprint image;
    a fingerprint recognition function configured to independently run a fingerprint recognition on all of the fingerprint test images;
    an authentication function configured to authenticate the identity of the person upon a positive outcome from all of the independently run fingerprint recognitions;
    wherein the fingerprint test image extraction function is configured to mask out information in an overlapping region in the fingerprint test images, such that the fingerprint test images are uncorrelated.

11. The device according to claim 10, further comprising a fingerprint sensor configured to acquire the sample fingerprint image.

12. The device according to claim 11, wherein the fingerprint sensor is of a size larger than or equal to 10×10 mm.

13. The device according to claim 11, wherein the fingerprint sensor is of a size larger than or equal to 14×14 mm.

14. The device according to claim 10, implemented in a wearable electronic device.

* * * * *